United States Patent [19]

Fischer et al.

[11] Patent Number: 4,764,397
[45] Date of Patent: Aug. 16, 1988

[54] FIBER-REINFORCED MATERIALS

[75] Inventors: Juergen Fischer, Ludwigshafen; Hartmut Zeiner, Plankstadt; Dietmar Nissen, Heidelberg; Gerhard Heinz, Weisenheim, all of Fed. Rep. of Germany

[73] Assignee: BASF Aktiengesellschaft, Ludwigshafen, Fed. Rep. of Germany

[21] Appl. No.: 814,917

[22] Filed: Dec. 30, 1985

[30] Foreign Application Priority Data

Jan. 11, 1985 [DE] Fed. Rep. of Germany ....... 3500705

[51] Int. Cl.⁴ .......................... B05D 7/02; C08J 3/24; C08L 81/00
[52] U.S. Cl. .................... 428/269; 156/176; 427/180; 427/385.5; 427/389.8; 427/389.9; 427/195; 428/272; 428/273; 428/290; 428/295; 524/540; 525/534; 525/535
[58] Field of Search .............. 427/385.5, 389.9, 389.8, 427/180, 195; 428/269, 419, 474.4, 426, 475.5, 290, 295, 267, 268, 272, 273; 156/176

[56] References Cited

U.S. PATENT DOCUMENTS

| | | | |
|---|---|---|---|
| 3,354,129 | 11/1967 | Edmonds, Jr. et al. | 528/265 |
| 3,784,504 | 1/1974 | Feasey et al. | 260/37 N |
| 3,839,287 | 10/1974 | Kwiatkowski et al. | 260/49 |
| 4,269,953 | 5/1981 | Brand | 525/534 |
| 4,293,670 | 10/1981 | Robeson et al. | 525/436 |
| 4,304,896 | 12/1981 | Keller et al. | 528/9 |
| 4,417,039 | 11/1983 | Reinhardt et al. | 526/285 |
| 4,477,496 | 10/1984 | Das et al. | 427/389.8 |
| 4,483,889 | 11/1984 | Andersson | 427/389.9 |
| 4,486,373 | 12/1984 | Kurauchi et al. | 264/137 |
| 4,489,027 | 12/1984 | St. Clair et al. | 264/137 |
| 4,522,875 | 6/1985 | Still, Jr. et al. | 428/419 |
| 4,563,232 | 1/1986 | Peake | 427/389.9 |
| 4,563,289 | 1/1986 | Thompson | 427/389.9 |
| 4,585,700 | 4/1986 | Johnson et al. | 428/419 |
| 4,624,997 | 11/1986 | Robeson et al. | 525/534 |
| 4,638,037 | 1/1987 | Ward et al. | 525/534 |

FOREIGN PATENT DOCUMENTS

| | | |
|---|---|---|
| 56703 | 7/1982 | European Pat. Off. . |
| 0157732 | 10/1985 | European Pat. Off. . |
| 2141129 | 12/1984 | United Kingdom . |

*Primary Examiner*—Allan M. Lieberman
*Attorney, Agent, or Firm*—Keil & Weinkauf

[57] ABSTRACT

Fiber-reinforced materials are produced by a process in which a heat-stable thermoplastic aromatic polyether A containing reactive groups, preferably nitrile groups and/or sulfur bridges and/or arylthio or alkylthio groups, if required together with a heat-stable thermoplastic polymer B which does not contain any reactive groups, is applied onto reinforcing fibers, the resulting semi-finished product is shaped, and the plastic matrix in the molding obtained is crosslinked so that there is virtually no increase in its glass transition temperature although the amount of soluble material is decreased to less than 60%, determined by extraction in boiling dichloromethane for one hour.

19 Claims, No Drawings

FIBER-REINFORCED MATERIALS

The present invention relates to moldings consisting of heat-stable plastics reinforced with oriented fibers, and a process for the production of such fiber-reinforced materials by applying the plastics onto reinforcing fibers.

High performance reinforced materials have been produced to date using virtually exclusively epoxy resins as the matrix material. These resins are of low viscosity and therefore have the advantage that the reinforcing fibers can be readily impregnated; however, they have the disadvantage that a semi-finished product produced from them cannot be stored indefinitely, and shaping and curing have to be carried out simultaneously. This disadvantage is overcome when heat-stable thermoplastics are used as the matrix material. However, these present other problems. If soluble, amorphous thermoplastics, eg. polysulfones or polyethersulfones, are used, the resulting moldings are sensitive to stress cracking owing to the solubility of the matrix material in organic solvents; this prevents them from being used, in particular, in the automotive sector. When an attempt is made to apply insoluble, partially crystalline thermoplastics, such as polyether ketones or polysulfide ketones, in the form of a melt onto reinforcing fibers, the result is that wetting of the fibers is insufficient owing to the high viscosity of the melt.

EP-A-No. 56 703 proposes impregnating fibrous structures with melts of low molecular weight, low-viscosity, thermoplastic polymers (although none of the stated polymers is an aromatic polyether possessing reactive groups). However, the resulting fiber-reinforced materials exhibit unsatisfactory toughness and expansion characteristics, particularly in the case of partially crystalline thermoplastics. Although EP-A-No. 56 703 indicates that the molecular weight may be increased subsequently, the methods recommended (solid-phase condensation, addition of crosslinking agents and irradiation) result, in the case of the polymers described there, in uncontrollable and undesirable side reactions and hence in a deterioration in the mechanical properties of the ready-produced articles. Furthermore, they require expensive apparatus.

U.S. Pat. No. 3,785,916 describes a process for the production of a reinforced material, in which carbon fibers are impregnated with a solution of a thermoplastic aromatic polymer, preferably a polysulfone, and the composite is compressed after evaporation of the solvent. This compression should be carried out at above the softening point of the polysulfone, and is carried out in the Examples at 85° and 95° C. above the glass transition temperature. Under these conditions, polysulfones (which do not contain any reactive groups) do not undergo crosslinking, which would lead to a marked reduction in the amount of soluble constituents. If, instead of the polysulfones, the insoluble or sparingly soluble polysulfide ketones or polysulfide sulfones which are likewise mentioned in U.S. Pat. No. 3,785,916 (and contain sulfur bridges but are not polyethers) were to be applied from the melt onto carbon fibers, and the composite heated at 85° or 95° C. above the glass transition temperature, crosslinking would likewise be absent.

European Patent Application No. 85 104 856.1 (U.S. Ser. No. 731,719) claims a process for the production of fiber-reinforced materials possessing increased heat distortion resistance and stress cracking resistance, in which a crosslinkable thermoplastic aromatic polyether A containing reactive groups and possessing a glass transition temperature above 80° C., if necessary together with a polymer B which does not contain any reactive groups and has a glass transition temperature above 80° C., is applied onto reinforcing fibers, the resulting semi-finished product is shaped, and the plastic matrix in the molding obtained is crosslinked so that its glass transition temperature increases by not less than 20° C., and it becomes virtually insoluble in lower-boiling chlorohydrocarbons.

Crosslinking is carried out by heating the molding at above 200° C., several hours generally being required.

We have found that even a fairly small amount of crosslinking is sufficient if the intention is not to increase the heat distortion resistance of the fiber-reinforced material but only to eliminate the particularly critical susceptibility to stress cracking. In this case, substantially shorter heating times are adequate. The smaller amount of crosslinking also has an advantageous effect on the toughness of the moldings.

The present invention accordingly relates to a process for the production of moldings of a heat-stable plastic reinforced with oriented fibers, in which a crosslinkable thermoplastic aromatic polyether A containing reactive groups and having a glass transition temperature above 80° C., if necessary together with a polymer B which does not contain any reactive groups and has a glass transition temperature above 80° C., is applied onto reinforcing fibers, the resulting semi-finished product is shaped, and the plastic matrix in the molding obtained is crosslinked so that its proportion of soluble constituents, which is determined by extraction in boiling dichloromethane for one day, is reduced to below 60%, but the glass transition temperature of the molding increases by less than 20° C.

Prior to crosslinking, the plastic matrix contains virtually no insoluble constituents. Where application is from solution, the figure is exactly 0%; for other methods of application, up to 10%, preferably up to 5%, in particular up to 1%, of insoluble constituents in the plastic matrix can be tolerated.

For the purposes of the present invention, polymers are those having a degree of polymerization of not less than 5, preferably not less than 10, in particular not less than 20.

Preferred crosslinkable polymers A are aromatic polyethers which carry nitrile groups and/or sulfur bridges and/or arylthio or alkylthio groups. Arylthio is the group —S—R, where R is unsubstituted or substituted aryl, eg. phenyl, naphthyl or pyridyl, which may be substituted by, for example, halogen, aryl or alkyl; alkylthio is the group —S—R', where R' is alkyl of 1 to 6 carbon atoms.

The stated groups can, on the one hand, improve the solubility of the polyether A in organic solvents and, on the other hand, act as a starting point for the crosslinking reaction, in which covalent bonds are formed.

Furthermore, the solubility of polyether A may be improved by the presence of heterocyclic groups in the polymer molecule, eg. the —N= group, or by meta bonding of the individual members within the polymer chain.

Other reactive groups which can act as the starting point for a crosslinking reaction are as follows:

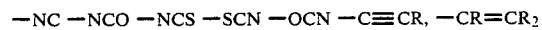

—NC  —NCO  —NCS  —SCN  —OCN  —C≡CR,  —CR=CR$_2$

-continued

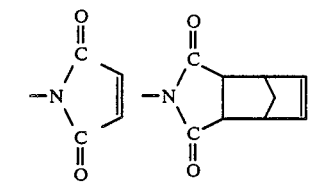

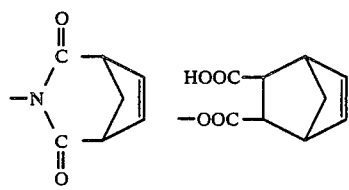

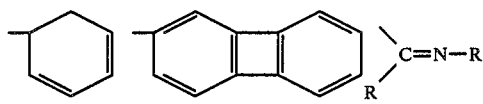

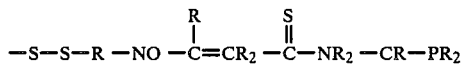

$$-S-S-R \quad -NO \quad -\overset{R}{\underset{}{C}}=CR_2 \quad -\overset{S}{\underset{}{C}}-NR_2 \quad -CR-PR_2$$

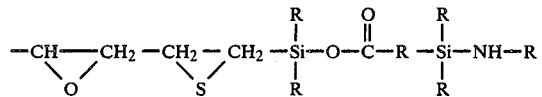

and the following groups in the polymer chain:

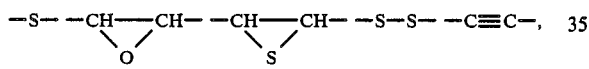

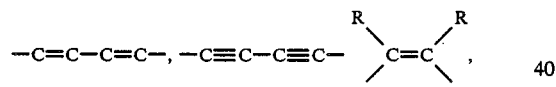

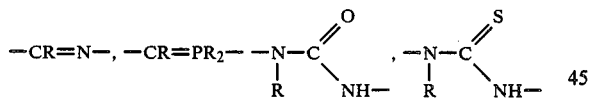

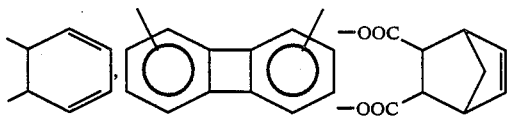

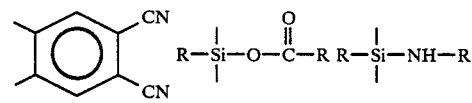

In all these formulae, R is hydrogen or aryl.

In certain circumstances, alkyl radicals and halogen substituents may also act as reactive groups.

Because of the presence of reactive groups in polymer A it is not necessary to add chemical crosslinking agents in the process according to the invention.

Aromatic polyethers A of the general formula —X—O—Y—O—, where X is aryl which carries one or more nitrile and/or arylthio groups, and Y is a diphenol radical, preferably the bisphenol S radical

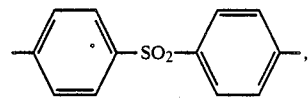

the bisphenol T radical

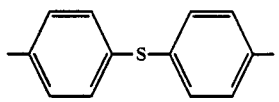

or the bisphenol A radical

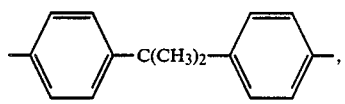

are particularly preferred.

Other useful radicals are those of the following diphenols:

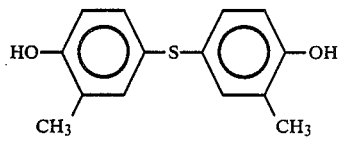

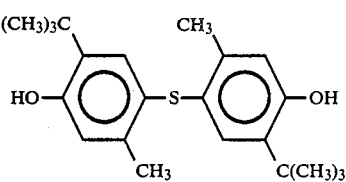

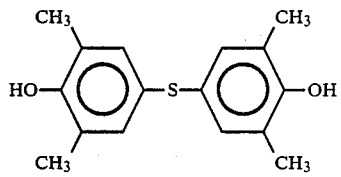

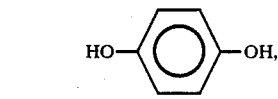

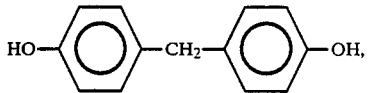

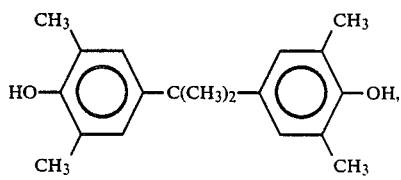

-continued
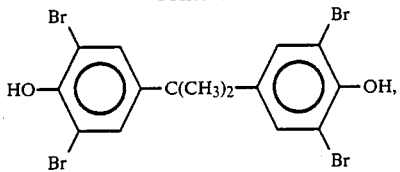
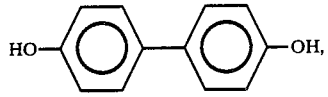
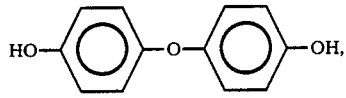
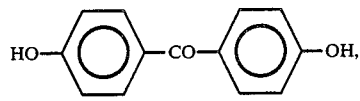
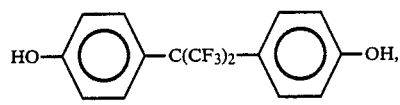
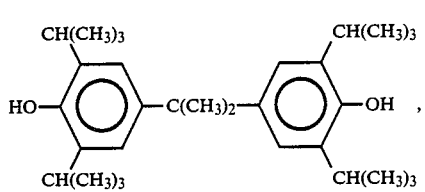
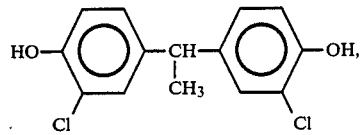
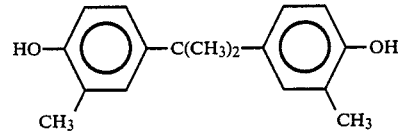
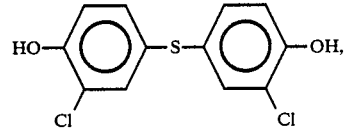
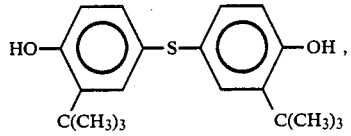
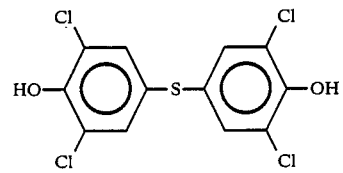
-continued
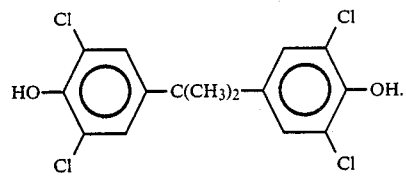
Examples of suitable aryl radicals X are:
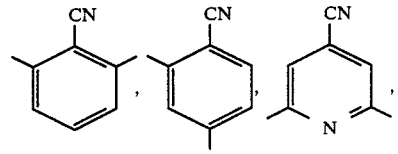
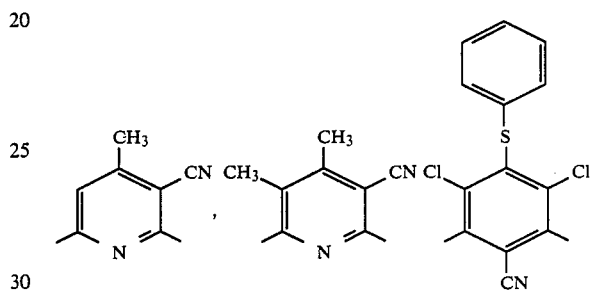
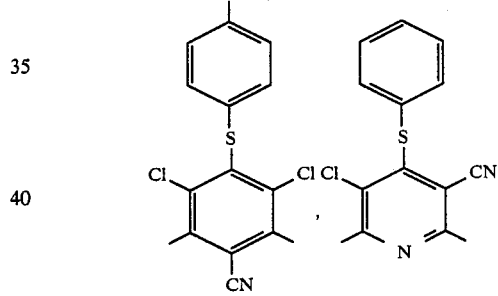
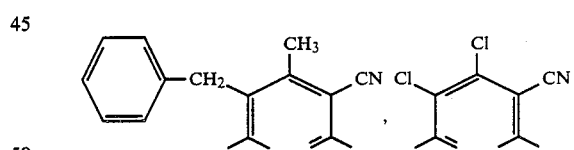
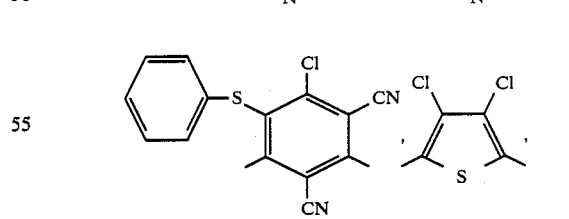
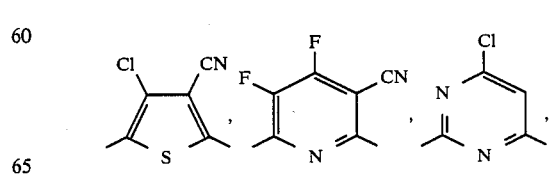

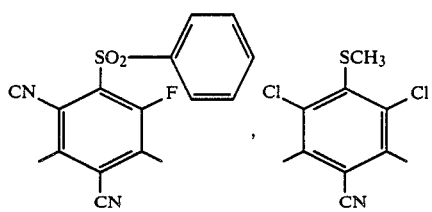

It is also possible to use mixtures of two or more different polymers A, as well as copolymers which contain different monomer units X and Y.

Other preferred polyethers A are those which are composed of units of the formula

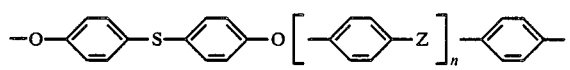

where Z is $SO_2$ or CO and n is 1 or 2, and, if desired, also units of the formula

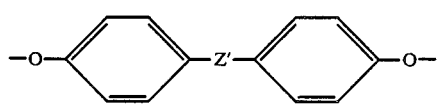

where Z' is O, CO, $SO_2$ or $C(CH_3)_2$.

They contain sulfur bridges as the only reactive groups, and are prepared by polycondensation of 4,4'-thiodiphenol with dichlorodiphenyl sulfone or difluorobenzophenone. Some, preferably from 50 to 95 mol%, of the 4,4'-thiodiphenol may be replaced with other bisphenols, eg. bisphenol A or dihydroxydiphenyl sulfone.

Such copolyethers are particularly useful for the purpose according to the invention since, in contrast to the homopolymers, they contain fewer sulfur bridges and therefore have a lower crosslinking potential. By adjusting the amount of comonomers and hence the amount of S groups, it is possible to control the crosslinking potential and this the rate and extent of crosslinking.

The polyethers A are heat-stable plastic, ie. their glass transition temperature is above 80° C., preferably above 100° C., in particular above 130° C. They are preferably amorphous, ie. they do not contain any crystalline constituents.

In the novel process, either the polyether A alone or a mixture of polymer A with a heat-stable thermoplastic polymer B which does not contain any reactive groups and likewise has a glass transition temperature above 80° C., preferably above 100° C., in particular above 130° C., may be applied onto the reinforcing fibers. The polymers B are likewise preferably amorphous and soluble in organic solvents. Polyethersulfones

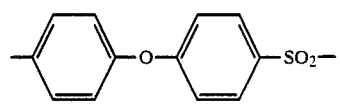

and polysulfones

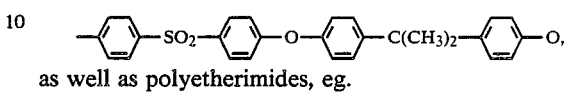

as well as polyetherimides, eg.

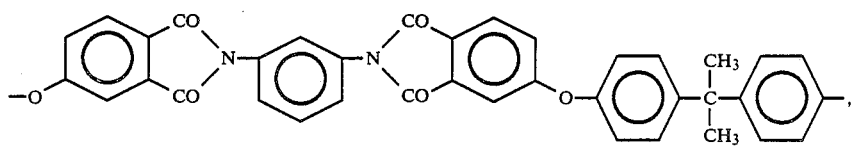

polycarbonates, aromatic polyethers and aromatic polyesters are preferred.

Polymers A and B are employed in a weight ratio of from 100:0 to 1:99. Although polymers B do not themselves contain any reactive groups, they are also incorporated into the crosslinked structure during the crosslinking reaction, so that they become virtually insoluble and lose their susceptibility to stress cracking. This is the case in particular for mixtures of A. from 2 to 50 parts by weight of an aromatic polyether composed of units of the formulae

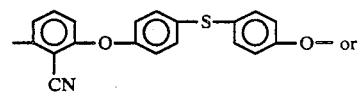

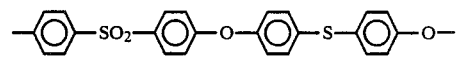

and

B. from 98 to 50 parts by weight of a polyethersulfone or polysulfone.

Suitable reinforcing fibers are the conventional rovings, for example those of glass, carbon or aromatic nylons (®Aramid fibers). They can be employed as individual rovings, as parallel laid webs or as woven fabrics. The volume ratio of plastic to reinforcing fibers is preferably from 70:30 to 15:85, in particular from 55:45 to 35:65.

In a preferred method of production, the reinforcing fibers are impregnated with a solution of the thermoplastic polymer. Preferred solvents are low-boiling organic liquids, in particular chlorohydrocarbons having a boiling point below 80° C.

Dichloromethane and a mixture of the latter with chloroform in a volume ratio of about 1:1 are particularly suitable, and trichloroethane, chloroform, hexafluorobenzene, aliphatic fluorohydrocarbons and higher chlorohydrocarbons are also useful. In principle, it is also possible to use fairly high-boiling solvents, such as dimethylformamide or N-methylpyrrolidone. However, these solvents are difficult to remove from the semi-finished product. Preferably, impregnation is carried out using 5–40, in particular 10–30, % strength by weight solutions. The solutions should have a viscosity of less than 10,000, preferably less than 5,000, in particular from 50 to 1,000, mPa.s. During impregnation, the rovings, either individually or next to one another in the form of a tape, are drawn through the solvent bath. During this procedure, the rovings should be very well spread out, i.e. pulled apart to form a sheet-like structure, which can be done by means of a known apparatus.

The fiber content of the impregnated rovings can be influenced by the concentration of the impregnating solution and the residence time in the bath, and by means of a pair of squeeze rolls arranged downstream of the impregnating bath. Downstream of the impregnating bath, the impregnated rovings pass through a drying zone, where the solvents are evaporated, preferably at above 60° C., in particular from 80° to 150° C.

The impregnated prepeg rovings bonded with the synthetic resin and in the form of individual filaments or of 0.5–2 cm wide tapes are non-tacky and can be wound onto bobbins. They are semi-finished products which have a long shelf life and can be further processed by a thermoplastic method. For example, they can be wound onto mandrels after passing through a preheating zone, this being done, if necessary, even directly after impregnation and drying; on the mandrels, they can be bonded by heating at from 160° to 300° C., and rotationally symmetrical moldings, eg. pipes, can be produced in this manner.

Furthermore, the impregnated roving can be positioned directly on a winding mandrel before the solvent is removed.

Sheet-like prepegs can be produced by a method in which a large number of parallel rovings are passed through the impregnating bath, and the resulting impregnated roving tape which is bonded with synthetic resin and preferably from 2 to 150 cm wide is dried and then cut into sheet-like pieces, or wound continuously on bobbins.

These unidirectionally fiber-reinforced prepegs, which are preferably from 0.1 to 0.5 mm thick, can be stacked one on top of the other in layers, and the individual prepegs can be laid at any angle with respect to one another. The stacks can then be shaped to finished articles by pressing, preferably at above the softening range of the polymers. To do this, the stack is heated, for example outside the press, and is then placed in the press, which is kept at a temperature below the glass transition point of the polymer.

It is also possible to impregnate woven fabrics with solutions of the polymer. Evaporating off the solvent gives sheet-like semi-finished products, which may be further processed as above.

In the resulting moldings, the plastic matrix is finally crosslinked so that its solubility is reduced and in particular the susceptibility to stress cracking is eliminated. The amount of soluble material in the plastic matrix, which is completely soluble prior to crosslinking, is determined by extraction with boiling dichloromethane in a Soxhlet apparatus for one day, and is found to be reduced to less than 60%, preferably from 5 to 50%. The increase in the glass transition temperature measured for crosslinked molding and due to the crosslinking must be less than 20° C., preferably less than 10° C., in particular less than 5° C.

Crosslinking of the plastic matrix is advantageously effected by heating the moldings in the presence or absence of a crosslinking catalyst. Particularly suitable crosslinking catalysts are Lewis acids, eg. zinc chloride or aluminum chloride, which are mixed with the polymers in amounts of, preferably, from 0.5 to 5% by weight, as well as metal oxides, eg. alumina and iron(II) oxide, and diphenyl disulfide and thiophosphates. The moldings are preferably heated for not less than 3, in particular from 10 to 200, minutes at above 200° C., in particular from 250° to 450° C., and the temperature should be from 100° to 200° C. above the glass transition temperature of the polyether A. Heating can be effected by heat transfer by means of heat conduction (for example by hot-pressing), by infrared treatment (for example after-treatment of the moldings in a radiation chamber) or by irradiation with microwaves (for example in a microwave oven or waveguide), and conventional absorption agents may be added in the case of the irradiation methods.

The resulting moldings are not susceptible to stress cracking and have good mechanical properties even at elevated temperatures, eg. from 150° to 200° C.

In another preferred process, the reinforcing fibers are impregnated with a melt of the thermoplastic polymers. This melt should have a very low viscosity, ie. a viscosity of less than 100,000, preferably less than 20,000, in particular from 1,000 to 10,000, mPa.s.

In this process, crosslinkable thermoplastic polyethers A carrying nitrile and/or arylthio or alkylthio groups and/or sulfur bridges and having a glass transition temperature above 80° C. are preferably processed. They may be mixed with thermoplastic polymers B which do not contain any reactive side groups, suitable substances of this type being not only the amorphous polysulfones and polyethersulfones but also heat-stable polymers, such as polyether ketones, polyphenylene sulfides, polysulfide ketones or nylons, which are partially crystalline and therefore insoluble. The process steps of impregnation, shaping and crosslinking are similar to those described above.

In another process, plastic powder, consisting of polyether A and, if required, polymer B, is applied onto reinforcing fibers. The powder preferably has a mean particle size of from 5 to 15 μm. The rovings, which are very well spread out by blowing with a jet of air or by means of other known apparatuses, are pre-heated and drawn through a fluidized bed containing the plastic powder. In this procedure, the plastic powder is at a temperature just below the glass transition temperature or melting point. The plastic powder adhering to the reinforcing fibers is then melted, the fibers being impregnated. This is followed by the further process steps described above.

Another process starts from plastic fibers which consist of a polyether A and, if desired, a polymer B, and produces a woven fabric of these fibers and reinforcing fibers, for example one type of fiber constituting warp threads and the other type filling threads. Hybrid yarns which consist of different types of individual filaments, eg. carbon filaments and polymer filaments, may also be used. The plastic fibers are melted during the shaping process, and the resulting semi-finished products are further processed as described above.

Finally, it is also possible to start from a plastic film consisting of a polyether A and, if required, a polymer B, and to drape such films one on top of the other in one or more layers together with sheet-like structures consisting of reinforcing fibers. The layers are then pressed at above the melting range of the plastics, and the resulting semi-finished product is further processed in the manner described.

The present invention furthermore relates to fiber-reinforced materials which have a glass transition temperature above 100° C., preferably above 150° C., and contain a heat-stable thermoplastic polyether A carrying reactive groups, if necessary together with a heat-stable thermoplastic polymer B which does not carry any reactive groups, and from 30 to 80% by volume of oriented reinforcing fibers, wherein the plastic matrix is crosslinked via the reactive groups so that it contains from 5 to 60% of soluble material, as determined by extraction with boiling dichloromethane for one day.

Fiber-reinforced materials of this type are very tough and possess good heat-distortion resistance and resistance to solvents and to stress cracking, and are used as automobile components and in the aviation and space flight industries.

In the Examples, parts and percentages are by weight.

EXAMPLES (a) Preparation of the polyether A1

54.57 g (0.25 mole) of 4,4'-thiodiphenol and 43.0 g (0.25 mole) of 2,6-dichlorobenzonitrile are dissolved in 420 ml of N-methylpyrrolidone and 190 ml of toluene, and 35.88 g (0.26 mole) of anhydrous potassium carbonate are added. The reaction mixture is heated to 150° C. in the course of 2 hours, an azeotropic mixture of water and toluene being distilled off continuously. When all of the toluene has been removed, the temperature is increased to 180° C., and the reaction mixture is left at this temperature for 5 hours. The polycondensation is terminated by passing in a stream of methyl chloride for 30 minutes.

300 ml of chlorobenzene are added, the inorganic components are filtered off and the polymer is then precipitated in a mixture consisting of equal amounts of 1% strength acetic acid and methanol. The product is washed carefully with water and methanol and then dried for 12 hours at 100° C. under reduced pressure. The polymer has an intrinsic viscosity $[\eta]_{NMP}^{25°\ C.}$ of 0.69 dl.g$^{-1}$ and a glass transition temperature Tg of 153° C.

(b) Preparation of the polyether A2

0.25 mole of 4,4'-thiodiphenol and 0.25 mole of 2,5-dichloro-3-cyano-4-methylpyridine are subjected to a polycondensation reaction as described under (a), except that the reaction temperature is 150° C.

The resulting polymer A2

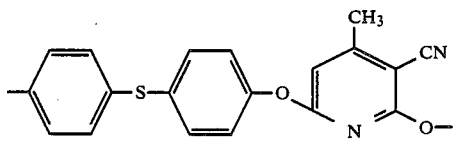

has a glass transition temperature of 154° C. and an intrinsic viscosity $[\eta]_{NMP}^{25°\ C.}$ of 0.21 dl.g$^{-1}$.

(c) Preparation of the copolyether A3

The procedure described under (b) is followed, except that 0.125 mole of 2,6-dichlorobenzonitrile and 0.125 mole of 2,5-dichloro-3-cyano-4-methylpyridine are used. The resulting copolymer A3 has a glass transition temperature Tg of 148° C. and an intrinsic viscosity of 0.20 dl.g$^{-1}$.

(d) Preparation of the polyether A4

0.25 mole of 4,4'-thiodiphenol and 0.25 mole of dichlorodiphenyl sulfone are dissolved in 420 ml of N-methylpyrrolidone and 190 ml of toluene, and 0.26 mole of anhydrous potassium carbonate is added. The reaction mixture is heated to 150° C. in the course of 2½ hours, an azeotropic mixture of water and toluene being distilled off continuously. When all of the toluene has been removed, the temperature is increased to 180° C., and the reaction mixture is left at this temperature for 12 hours. The polycondensation is terminated by passing in a stream of methyl chloride for 30 minutes.

300 ml of chlorobenzene are added, the inorganic components are filtered off and the polymer is precipitated in a mixture consisting of equal amounts of 1% strength acetic acid and methanol. The product is washed carefully with water and methanol and then dried for 12 hours at 100° C. under reduced pressure. The resulting polyether thioether sulfone has a glass transition temperature of 165° C. and an intrinsic viscosity of 0.80 dl.g$^{-1}$.

(e) Preparation of the copolyether A5

0.25 mole of potassium carbonate is added to a mixture of 0.18 mole of bisphenol A, 0.06 mole of 4,4'-thiodiphenol and 0.34 mole of 4,4'-dichlorodiphenyl sulfone. The procedure is continued as described in (d). The resulting copolymer has a glass transition temperature of 183° C. and an intrinsic viscosity of 1.1 dl.g$^{-1}$.

(f) Preparation of the copolyether A6

0.25 mole of potassium carbonate is added to a mixture of 0.125 mole of 4,4-thiodiphenol, 0.125 mole of dihydroxydiphenyl sulfone and 0.25 mole of 4,4'-dichlorodiphenyl sulfone, and polycondensation and working up are carried out as described under (e). The glass transition temperature is 195° C. and the intrinsic viscosity is 0.70 dl.g$^{-1}$.

(g) Preparation of the polyether A7

0.3 mole of 4,4'-difluorobenzophenone, 0.3 mole of thiodiphenol and 500 g of diphenyl sulfone are heated at 180° C. under an inert gas, and 0.31 mole of anhydrous potassium carbonate is added. The reaction temperature is increased stepwise at intervals of 30 minutes, first to 200° C., then to 250° C. and finally to 300° C., and is then left at this temperature for 1 hour. The polycondensation is terminated by adding 0.5 mol% of 4,4'-difluorobenzophenone. The reaction mixture is cooled and then comminuted. Diphenyl sulfone and inorganic components are removed by extraction with acetone and repeated washing with water and methanol. The resulting polyether thioether ketone is dried for 12 hours at 120° C. under reduced pressure. Its glass transition temperature is 150° C., and the crystalline parts melt at 320° C.

(h) Preparation of the copolyether A8

A mixture of 0.125 mole of bisphenol A, 0.125 mole of thiodiphenol and 0.25 mole of 1,4-bis-(4-fluorobenzoyl)-benzene is dissolved in 600 ml of toluene under inert gas, and 0.26 mole of anhydrous potassium carbonate is added. The polycondensation and working up are carried out as described above.

EXAMPLE 1

A 20% strength solution of the polyether A1 in CH$_2$Cl$_2$, having a viscosity of 800 mPa.s at room temperature, is used for impregnating glass fibers (1200 tex roving from Gevetex).

Several parallel fibers are drawn through a bath containing the polymer solution, after which the solvent is stripped off at from 80° to 130° C. to give sheet-like, unidirectionally reinforced prepregs which are still thermoplastic. Four of these prepegs are draped one on top of the other so that all of the fibers are parallel. The laid web is heated in a press at 300° C. and under slightly elevated pressure for about 1 hour, after which the temperature is increased to 400° C. The entire curing process takes about 2 hours.

The ready-prepared sheet exhibits a dark discoloration, whereas the prepeg laid web is virtually colorless. The crosslinked sheet is resistant to stress cracking, and the glass transition temperature Tg remains virtually unchanged.

The shear modulus is 5000 N/mm$^2$ and decreases to 4000 N/mm$^2$ at 200° C. and only to 3000 N/mm$^2$ at 300° C. The fiber content is 70% by volume, and the amount of soluble material in the plastic matrix has fallen to 30%.

EXAMPLE 2

The procedure described in Example 1 is followed, except that only one glass roving is impregnated.

After passing through the drying zone, the impregnated prepeg roving is wound onto a bobbin. It has a glass fiber content of 70% by volume and is a semi-finished product with a long shelf life.

The prepeg roving is laid on a cylindrical mandrel, heated at about 200° C., on a conventional winding machine. The layers are arranged in the following pattern: 90°/90°/+45°/−45°/−45°/+45°/90°/90°; the mandrel diameter is 70 mm and the pipe is 100 mm long. When winding is complete, the pipe is crosslinked for 1 hour in an oven at 350° C. to give the finished article. The amount of soluble material in the plastic matrix has decreased to 50%.

EXAMPLE 3

A 20% strength solution containing equal amounts of the polyether A1 and a polyether sulfone having a glass transition temperature of 220° C. in CH$_2$Cl$_2$ is prepared. The solution has a viscosity of 800 mPa.s at room temperature and is used to impregnate glass fibers (1200 tex roving from Gevetex). In this procedure, several parallel fibers are drawn through a bath containing the polymer solution, after which the solvent is stripped off at from 80° to 130° C. to give sheet-like, unidirectionally reinforced prepegs.

4 of these prepegs are draped one on top of the other so that all of the fibers are parallel. The laid web is heated in a press for 2 hours at 350° C.

The ready-prepared sheet has a dark discoloration, whereas the prepeg laid web is virtually colorless. The glass transition temperature is unchanged. The shear modulus is 4500 N/mm$^2$ at 20° C., and the fiber content is 65% by volume.

An extraction experiment with CH$_2$Cl$_2$ shows that the amount of soluble material in the plastix matrix has decreased to 50%.

EXAMPLE 4

A 100 cm wide glass fabric having a weight per unit area of 280 g.m$^{-2}$ is impregnated with a 20% strength solution of the polyether A2 in CH$_2$Cl$_2$ by passing it continuously through an impregnating bath. It then passes through a vertical drying tower, the solvent being evaporated off at from 130° to 150° C. The resulting fabric prepeg is cut into 1 m lengths and stored as a semi-finished product.

16 fabric prepegs are laid one on top of the other in a press and pressed for 1 hour at 340° C. and under 10 bar; the glass transition temperature of the polyether does not change.

The fiber content is 60% by volume, and the amount of soluble material in the plastic matrix is 40%.

EXAMPLE 5

A 30% strength solution of the copolyether A3 in CH$_2$Cl$_2$, having a viscosity of 60 mPa.s at room temperature, is prepared. 100 parallel carbon fibers (T300 from TORAY) are drawn through this solution at a speed of 5 ... min$^{-1}$, after which the solvent is evaporated off at from 130° to 180° C. to give a sheet-like, thermoplastic, unidirectionally reinforced, 300 mm wide prepeg, from which 100 cm long pieces are cut off. 8 of these pieces are stacked one on top of the other so that all of the fibers are aligned parallel. The laid web is cured in a press at 320° C. and under 10 bar for 2 hours to give a sample sheet having a fiber content of 60% by volume. The amount of soluble material in the matrix has decreased to 55%, and the glass transition temperature of the copolyether is found to have remained virtually unchanged.

EXAMPLE 6

20 rovings of carbon fibers (T300 from TORAY) are spread out well and drawn through a bath containing a melt of the polyether A1, at a speed of 0.5 m.s$^{-1}$. The bath temperature is 280° C. After cooling, the 6 cm wide prepeg tape is wound on a bobbin. It constitutes a thermoplastic semi-finished product which has a long shelf life and can be shaped to finished articles as required and crosslinked at elevated temperatures.

EXAMPLE 7

A 30% strength solution of the polyether A4 in methylene chloride, having a viscosity of 400 mPa.a at room temperature, is used for impregnating a glass fabric (92 115 from Interglas). The fabric is drawn through an impregnating bath, and the solvent is evaporated off to give a sheet-like semi-finished product. Several layers of this semi-finished product are draped one on top of the other and placed in the mold of a platen press. The laid web is heated at 320° C. for 15 minutes. The resulting sheet which has a dark discoloration is resistant to methylene chloride. The glass transition temperature has increased by less than 5° C., the fiber content of the laminate is 60% by volume, the strength in the fiber direction is not less than 300 N.mm$^{-2}$, and the modulus of elasticity is 28,000 N.mm$^{-2}$. The amount of soluble material in the plastic matrix has decreased to 38%.

EXAMPLE 8

A glass fabric-reinforced finished article is produced from the copolyether A5 in a manner similar to that described in Example 7. The laminate is heated for 30 minutes at 320° C. The amount of soluble material in the matrix is then still 50%.

EXAMPLE 9

A carbon fabric (Interglas) is impregnated with a 20% strength solution of the copolyether A6 in dichloromethane, as described in Example 7. The resulting laminate is pressed at 380° C. for 20 minutes. The fiber content is 55% volume, and the amount of soluble material in the matrix is determined as 45%. The glass transition temperature of the copolyether remains virtually unchanged.

EXAMPLE 10

A 120 cm wide carbon fiber fabric from Interglas, having a weight per unit area of 150 g/m², is impregnated with a 20% strength solution of the polyether A7 in dichloromethane by passing the fabric continuously through an impregnating bath. It then passes through a vertical drying tower, the solvent being evaporated off at 100°–150° C. The resulting dry prepeg is calendered, and wound on a roll.

32 fabric prepeg webs are draped one on top of the other in a platen press and pressed at 350° C. and under 5 bar for 2 hours, the glass transition temperature remaining virtually unchanged.

The fiber content of the ready-prepared laminate is 62% by volume, and the amount of soluble material in the matrix is less than 50%.

EXAMPLE 11

Polymer A8 is processed to a polymer film by means of an extruder, and, directly after it is produced, the film is laid on a belt of carbon fibers (T300 from TORAY). Impregnation of the fibers is carried out in a heating zone at less 300° C. The impregnated fiber belt is then calendered, and wound on rolls. It constitutes a thermoplastic semi-finished product which can be stored as long as desired.

EXAMPLE 12

A solution of a polyether sulfone and a polyarylether thioether nitrile (as described in Example 1 of DE-A No. 34 14 492) in dichloromethane is used for impregnating a glass fabric (92 115 from Interglas). The two polymers are each used as a 10% strength solution, so that the solids content is 20%.

Impregnation and drying are carried out as described in Example 10. 16 fabric prepeg layers are processed at 360° C. for 60 minutes under 10 bar in a platen press. The amount of insoluble material in the mixed matrix increases during this period from 0 to about 50%, tested using $CH_2Cl_2$ as a solvent.

We claim:

1. A process for the production of moldings from a heat-stable plastic reinforced with oriented fibers comprising the steps of:
   (a) applying a heat-stable plastic material onto said reinforcing oriented fibers such that the volume ratio of plastic to fiber is in the range of from 70:30 to 15:85, and wherein said plastic material comprises a crosslinkable, thermoplastic, aromatic polyether characterized by the presence of reactive sulfur bridges, a degree of polymerization of at least 5, a glass transition temperature above 80° C. and a content of insoluble constituents not exceeding 10% by weight, and thereafter,
   (b) shaping the resulting product to obtain a molding whereby the plastic matrix of said molding becomes crosslinked so that its content of soluble material, determined by extraction in boiling dichloromethane for one day, is decreased to less than 60% although the glass transition temperature of the molding increases by less than 20° C.

2. The process in accordance with claim 1, wherein the plastic material is applied to the oriented fibers from a solution having a viscosity of less than 10,000 mPa.s, after which the solvent is evaporated and the resulting product shaped.

3. The process according to claim 2, wherein an organic solvent is used and the solution has a solids content of from 5 to 40% by weight.

4. The process according to claim 3, wherein said organic solvent is a chlorohydrocarbon having a boiling point of less than 80° C.

5. The process in accordance with claim 1, wherein the reinforcing fibers are impregnated with said plastic material in the form of a melt having a viscosity of less than 100,000 mPa.s.

6. The process in accordance with claim 1, wherein said plastic material is applied onto the reinforcing fibers in powder form with the powder being subsequently melted.

7. The process in accordance with claim 1, wherein a fabric based on fibers derived from said plastic material and reinforcing fibers composed of a non-plastic material is produced, and the plastic fibers are subsequently melted.

8. The process according to claim 1, wherein one or more layers of a sheet-like structure consisting of reinforcing fibers composed of a non-plastic material and of a film derived from said plastic material are draped one on the other, the layers are pressed together and the plastic film then melted.

9. The process in accordance with claim 1, wherein said plastic material consists of said crosslinkable thermoplastic aromatic polyether containing reactive sulfur bridges in combination with a thermoplastic polymer which does not contain reactive groups and has a glass transition temperature above 80° C., and wherein said components are employed in a weight ratio of from 100:0 to 1:99, respectively.

10. The process according to claim 9, wherein said polymer which does not contain reactive groups is selected from the group consisting of a polyether sulfone, a polysulfone, a polyetherimide, a polycarbonate, an aromatic polyether and an aromatic polyester.

11. The process of claim 1, wherein the aromatic polyether is composed of units of the formula

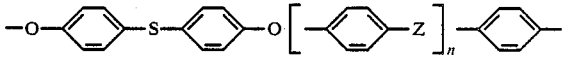

where Z is $SO_2$ or $CO_2$ and n is 1 or 2, and may or may not furthermore contain units of the formula

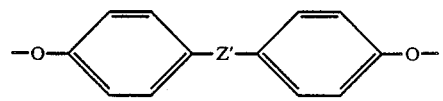

where Z' is O, CO, $SO_2$ or $C(CH_3)_2$.

12. The process of claim 1, wherein the aromatic polyether is a copolyether obtained from the polycondensation of a thiodiphenol with dichlorodiphenyl sulfone or difluorobenzophenone, wherein as much as 50–90 mol. % of said thiodiphenol is replaced with bisphenol a or dihydroxydipenyl sulfone.

13. The process of claim 1, wherein the reinforcing fibers are employed in the form of individual rovings, parallel laid webs or woven fabrics.

14. The process of claim 1, wherein crosslinking of the plastic matrix is carried out by heating in the presence or absence of a crosslinking catalyst.

15. The process of claim 14, wherein the molding is heated for not less than 3 minutes at 100°–200° C. above the glass transition temperature of the polyether present in said plastic matrix.

16. A process as defined in claim 14, wherein the plastic matrix is crosslinked by heating in the presence of a Lewis acid catalyst.

17. A process as defined in claim 15, wherein the plastic matrix is crosslinked by heating for from 10 to 200 minutes.

18. A fiber-reinforced molding constructed from a material having a plastic matrix consisting of a heat stable crosslinkable, thermoplastic, aromatic polyether with reactive sulfur bridges and which contains from 30 to 50% by volume of oriented fibers having a glass transition temperature above 100° C., said oriented fibers being individual rovings, parallel laid webs or woven fabrics, and wherein the plastic matrix is crosslinked via the reactive groups so that its content of soluble material is from 3 to 60%, determined by extraction with boiling dichloromethane for one day.

19. A fiber-reinforced molding according to claim 18, wherein said plastic matrix consists of said polyether polymer having reactive sulfur bridges in combination with a thermoplastic polymer which does not contain reactive groups and has a glass transition temperature above 80° C., and wherein the polymer with reactive sulfur bridges and the polymer without reactive groups are in a weight ratio of from 100:0 to 1:99.

* * * * *